United States Patent [19]
Mitchell

[11] 3,848,535
[45] Nov. 19, 1974

[54] RAPID TRANSIT SYSTEM
[76] Inventor: Bruce Mitchell, Sylmar, Calif. 83450
[22] Filed: Jan. 13, 1972
[21] Appl. No.: 180,769

Related U.S. Application Data
[63] Continuation-in-part of Ser. No. 140,959, May 6, 1971, abandoned.

[52] U.S. Cl..................... 104/88, 104/105, 104/168
[51] Int. Cl............................................. B61b 13/10
[58] Field of Search......... 104/89, 91, 96, 105, 106, 104/130, 134, 135, 147, 168

[56] References Cited
UNITED STATES PATENTS

| | | | |
|---|---|---|---|
| 939,334 | 11/1909 | Schmidt | 104/168 |
| 3,163,124 | 12/1964 | Hendrix | 104/135 |
| 3,483,829 | 12/1969 | Barry | 104/88 |
| 3,537,402 | 11/1970 | Harkess | 104/168 |
| 3,538,853 | 11/1970 | Dehne | 104/130 |
| 3,613,599 | 10/1971 | Seidman | 104/168 |

Primary Examiner—Robert G. Sheridan
Assistant Examiner—D. W. Keen
Attorney, Agent, or Firm—Robert E. Geauque

[57] ABSTRACT

A rapid transit system having a multiplicity of cars movable independently along a guide complex spaced therealong and many side guide lines leading from each main line or feeder line to the stations and then back to the same line again. Automatic car routing means are provided for routing the cars from any station of departure to any selected station of destination with no intermediate stops and at a uniform high rate of speed. The cars are propelled by motor driven rollers mounted at the ends of the guide beams and disposed for driving engagement with the longitudinal edges of two bars which movably support the cars on the guide rollers or slides.

8 Claims, 21 Drawing Figures

PATENTED NOV 19 1974
3,848,535
SHEET 1 OF 5
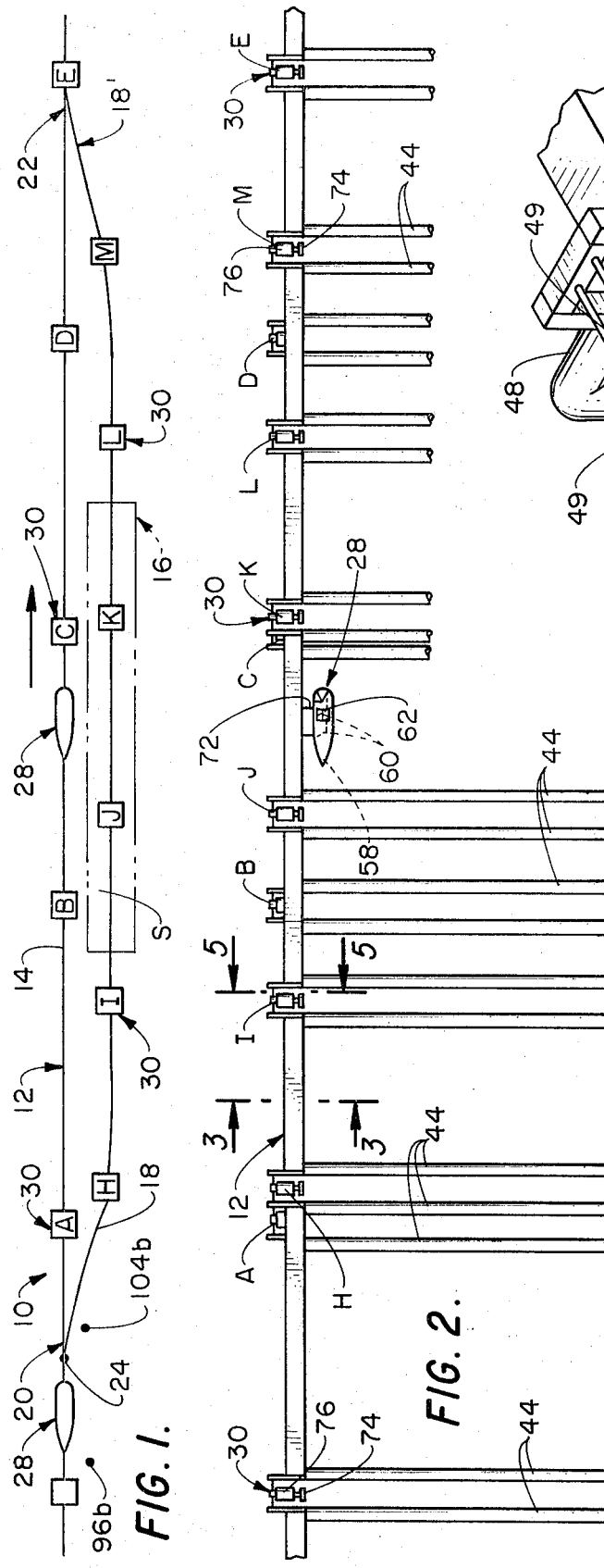
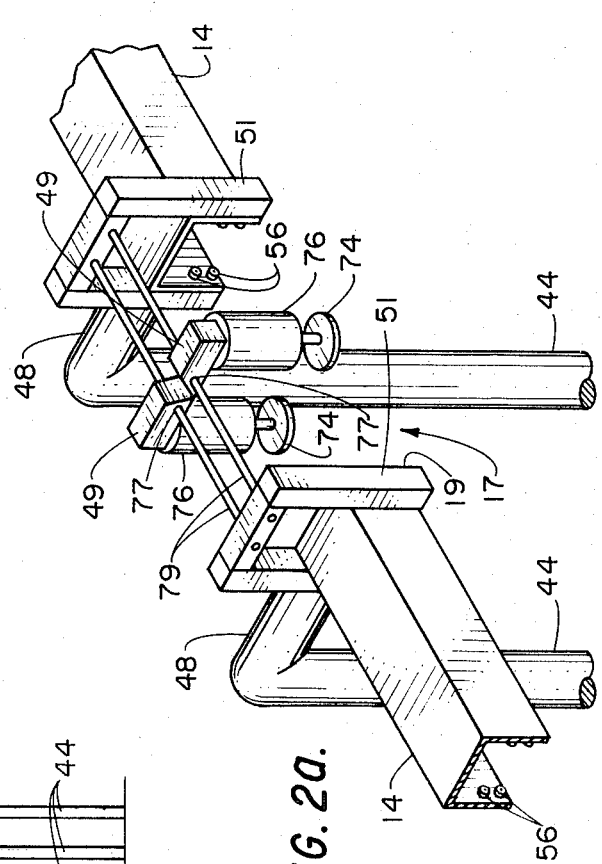
INVENTOR.
BRUCE MITCHELL
BY
R. E. Geauque
ATTORNEY

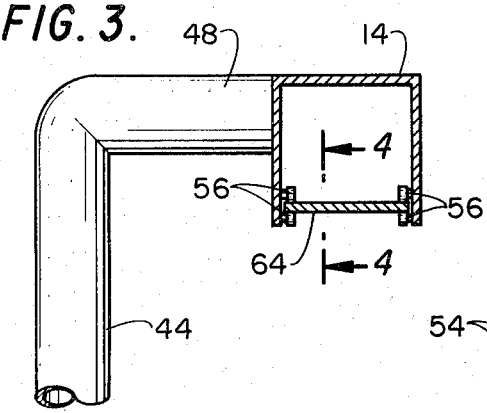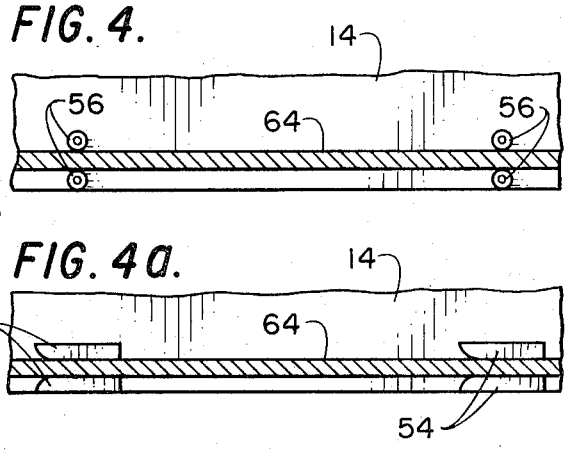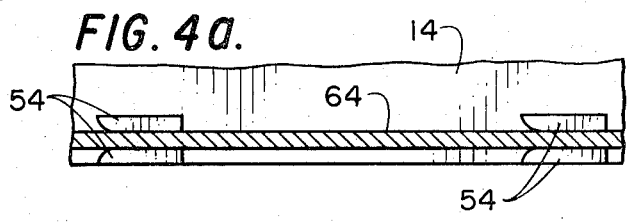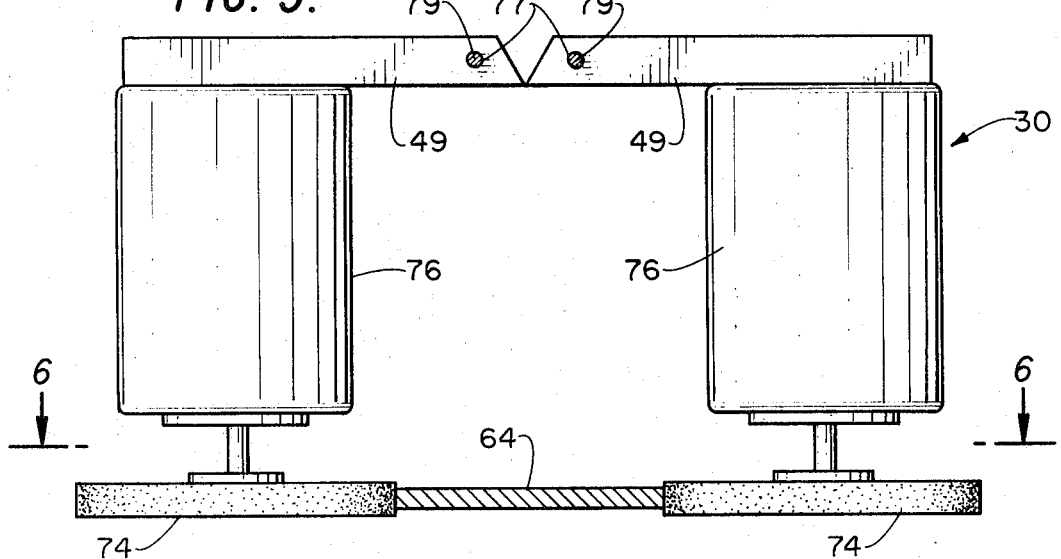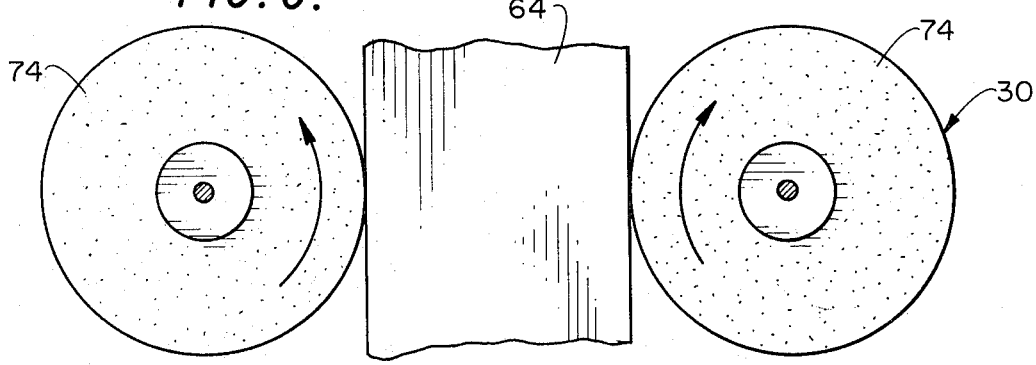

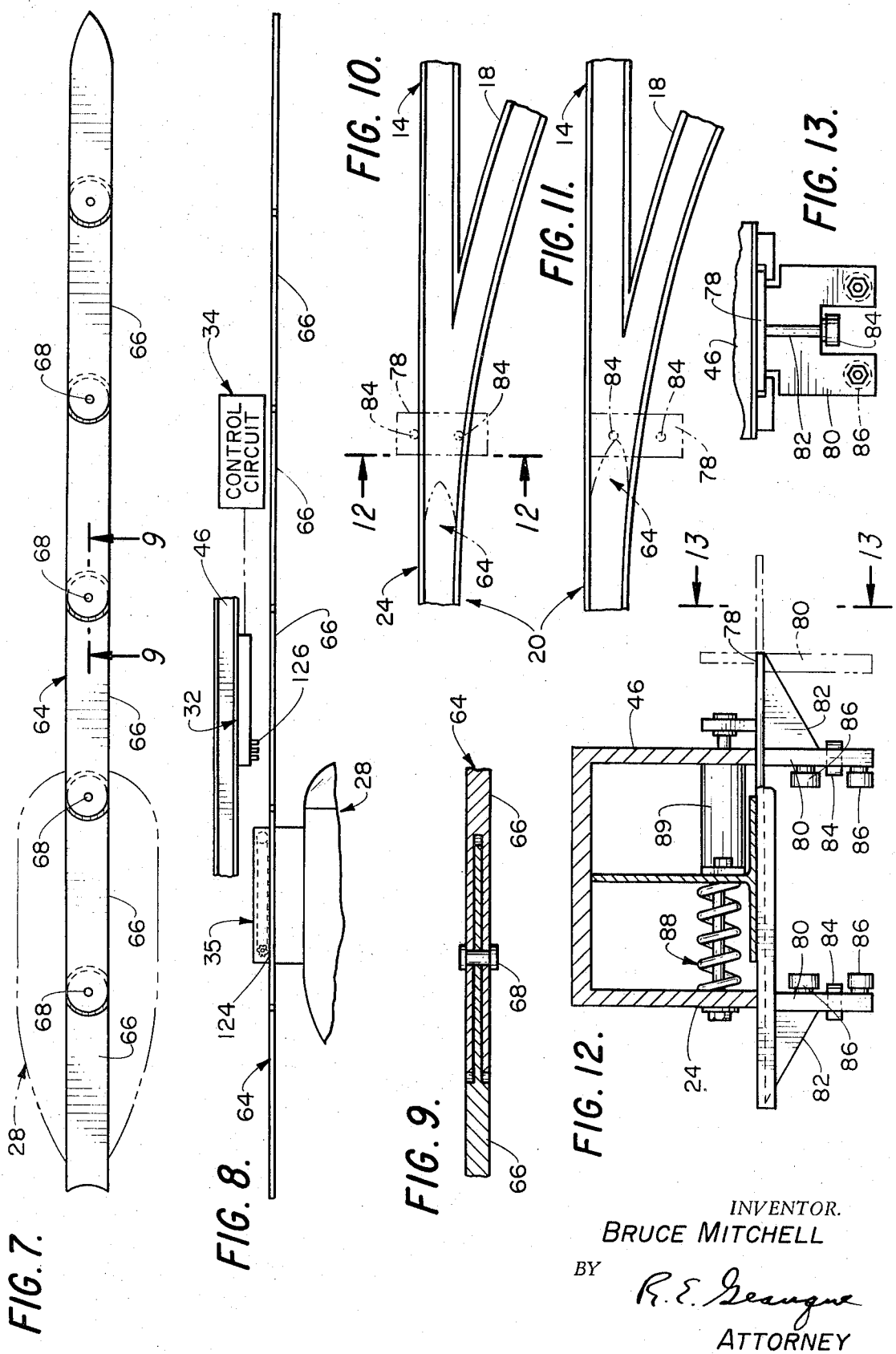

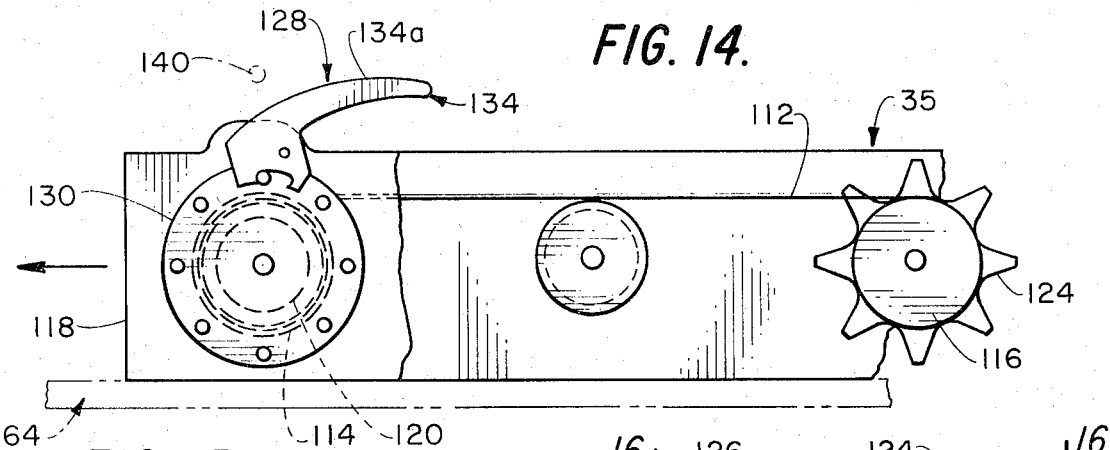
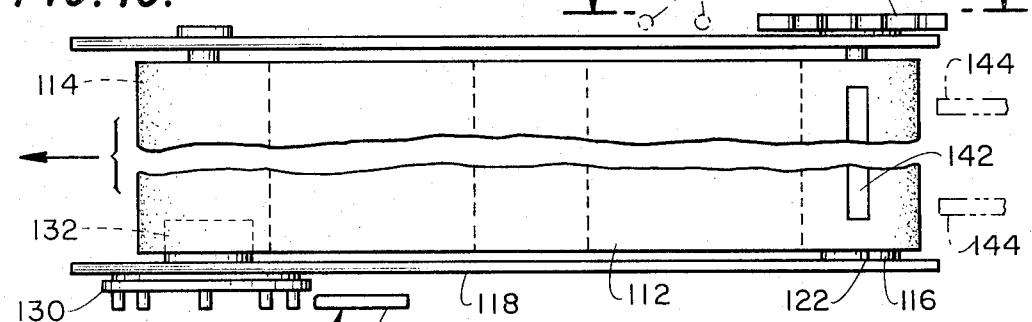
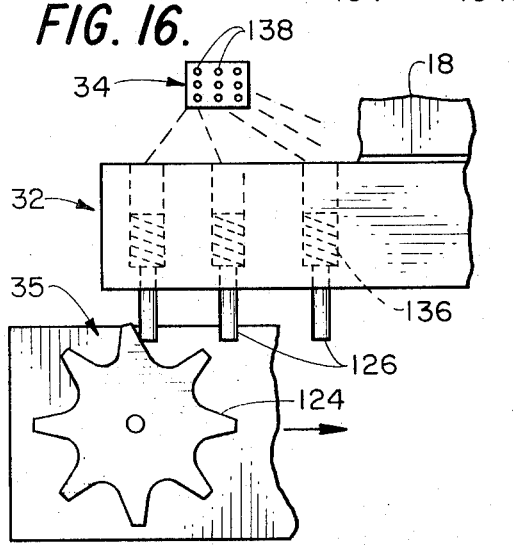
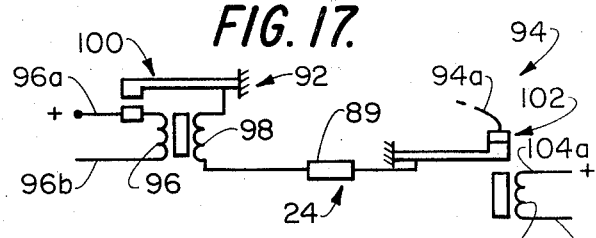
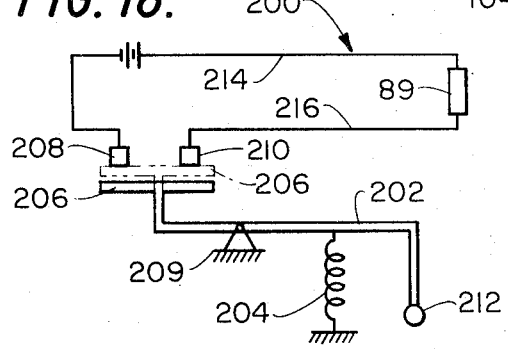

INVENTOR.
BRUCE MITCHELL
BY
R. E. Geauque
ATTORNEY

RAPID TRANSIT SYSTEM

This application is a Continuation-in-part of patent application Ser. No. 140,959, filed May 6, 1971 now abandoned, entitled Rapid Transit System by the present inventor.

BACKGROUND OF THE INVENTION

1. Field of the Invention

This invention relates generally to the field of transportation and has more particular reference to a novel high-speed transit system.

2. Prior Art

As will appear from the ensuing description, the features of the invention may be embodied in a rapid transit system for transporting either cargo or passengers. However, the invention is particularly concerned with and will be described in connection with a rapid transit system for transporting passengers.

The ever increasing congestion on city streets, freeways, and other vehicular arteries, both inter-city and intra-city, has created mounting interest in high speed ground transportation systems. A great variety of such systems have been proposed. The present invention provides an improved rapid transit system of this type.

It is well known that the acceptance of a rapid transit system by the general public depends upon its ability to provide economical transportation which is as fast or faster than other existing forms of transportation, such as the personal automobile, buses, streetcars, and the like. By way of example, a rapid transit system, to be acceptable, must be capable of transporting as many people over any given main route of the transit system as a typical freeway. Moreover, the transit system must be safer than the automobile and must be capable of reliable operation in all kinds of weather. Preferably, the passenger service of the transit system should be immune to stoppage as a result of labor disputes. Summarizing, then, the ideal rapid transit system is one which satisfies five basic requirements, to wit, high speed, economy, reliability, safety, and continuous availability.

SUMMARY OF THE INVENTION

The present invention provides a rapid transit system which satisfies the foregoing requirements. In general terms, the rapid transit system of the invention is characterized by a multiplicity of cars which are driven independently along a guide line complex. This guide line complex includes many main lines and feeder lines with stations spaced at frequent intervals. Each station is located on a siding adjacent to a main line or feeder line. Each siding has length of guide line for deceleration before reaching the station and a length of guide line for acceleration to main line speed. Presettable automatic car routing means are embodied in the transit system for automatically directing any car from any station of departure to any selected station of destination. This automatic car routing means includes a station selector at each station which is adapted to be preset with a selected station of destination by a passenger at the time he boards a car at his particular station of departure or if the passenger is so disposed that he does not wish to preset his destination he can direct the car to any final destination by manual control. The car is then propelled from the station of departure, accelerated to main line speed before entering the main line, and then along the main guide line at a constant high speed rate toward the preselected station of destination. Just prior to arrival of the car at the junction of the main line with the deceleration line leading to the selected station of destination, a switch at the junction is moved to a position, wherein the switch is disposed to divert the car from the main line to the siding. As the car approaches the station of destination on the siding, the car is automatically braked to bring the vehicle to a smooth stop in front of the station. The passenger then disembarks to empty the car for the next passenger.

According to a feature of the invention, each car includes an elongate tow bar which is supported for endwise movement along the guide beams of the transit system and a cargo carrier which is firmly attached to the underside of the tow bar. In the disclosed embodiment of the invention, this cargo carrier is a passnger compartment or cab for holding one or two passengers. The car is propelled along the support beams by means of power driven rollers mounted at the ends of each support beam. These rollers are disposed for peripheral driving engagement with the longitudinal edges of the tow bar on each car and are spaced in such a way as to effect continuous driving of the car as the latter moves along the guide line. The driving rollers are started and brought up to speed just before the tow bar engages with them. Their power is shut off when the car passes through. All driving rollers on the main track run at the same speed so all cars travel at equal speeds. Acceleration and deceleration ocurs only on the sidings or to change speed from a feeder line to a main line. The passenger compartments of two adjacent cars traveling in unison along a track are prevented from direct contact by automatic reduction of power on the driving motors of the following car. An advantage of this feature of the invention resides in the fact that the cars may travel at high speed along the guide line system, in a closely spaced array, without danger of collision and without loss of independent control of the individual cars.

BRIEF DESCRIPTION OF THE DRAWINGS

FIG. 1 illustrates, in semi-diagrammatic fashion, a portion of a transit system according to the invention;

FIG. 2 is an enlarged side elevation of a portion of the transit system;

FIG. 2a is an enlarged perspective view of a typical end support of the guide beams;

FIG. 3 is an enlarged section taken on line 3—3 in FIG. 2;

FIG. 4 is a side elevation of the structure shown in FIG. 3, taken on line 4—4;

FIG. 4a is a view similar to FIG. 4 but showing the tow bar mounted upon slides instead of rollers;

FIG. 5 is an enlarged section taken on line 5—5 in FIG. 2;

FIG. 6 is a section taken on line 6—6 in FIG. 5;

FIG. 7 is a plan view of a passenger tow bar;

FIG. 8 is a side elevation of the tow bar and certain associated structure; FIG. 9 is an enlarged section taken on line 9—9 in FIG. 7;

FIG. 10 is an enlarged detail of the guide line switch junction embodied in the transit system showing the switch in a first position;

FIG. 11 is a view similar to FIG. 10 but showing the switch in a second position;

FIG. 12 is an enlarged section taken on line 12—12 in FIG. 10 showing the guide switching mechanism;

FIG. 13 is a section taken on line 13—13 in FIG. 12;

FIG. 14 is an enlarged side elevation of a passenger car mounted guide line switch operator which forms part of the automatic car routing means of the transit system;

FIG. 15 is a plan view of the switch operator in FIG. 14;

FIG. 16 is a view looking in the direction of the arrows on line 16—16 in FIG. 15;

FIG. 17 diagrammatically illustrates certain control circuitry embodied in the transit system;

FIG. 18 is a diagrammatic illustration of an override switch which is to be employed in conjunction with this invention.

DESCRIPTION OF THE PREFERRED EMBODIMENT

Figure 19:
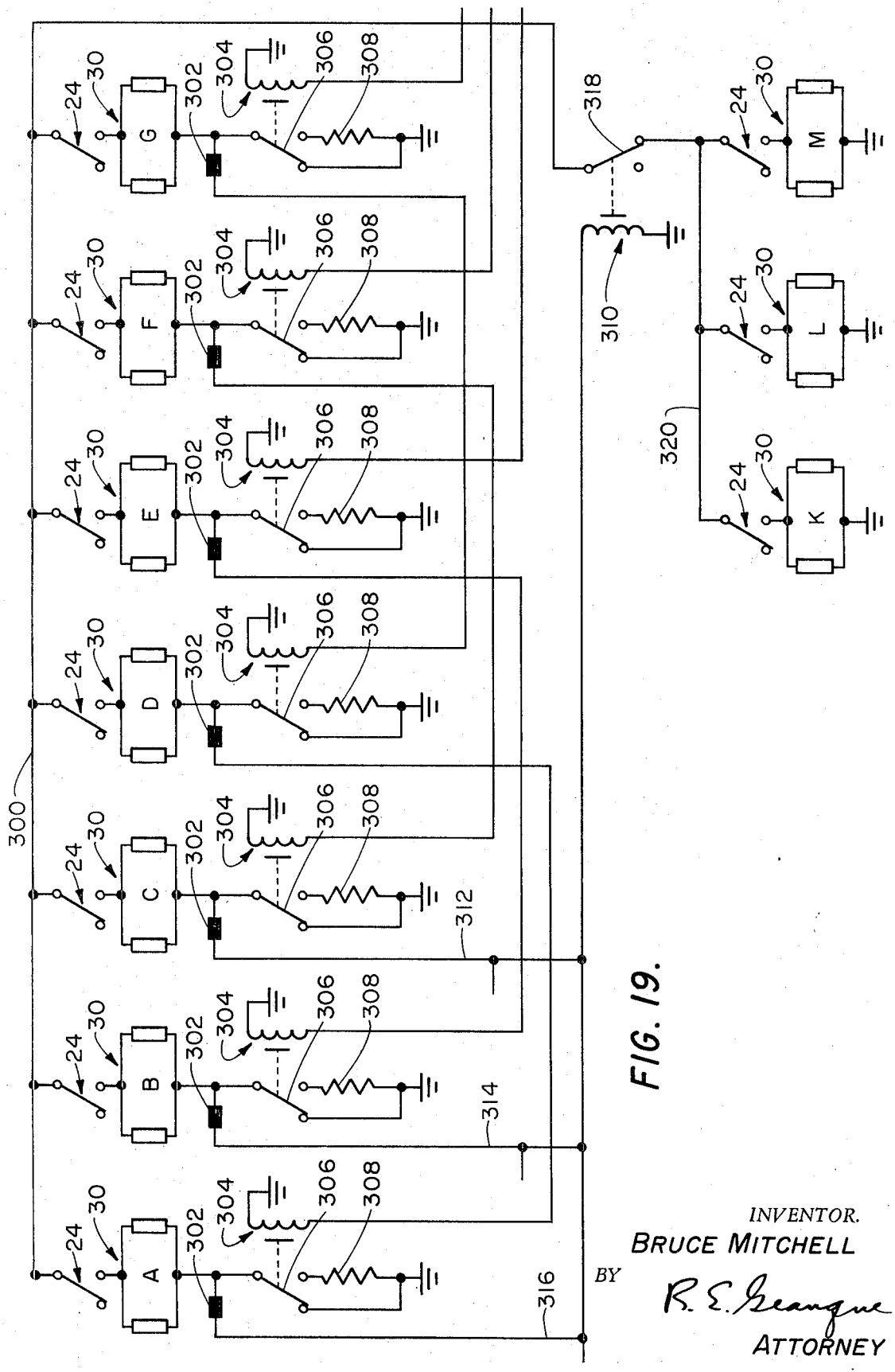
FIG. 19 is an electrical circuit for the motors employed within this invention.

Turning now to the drawings, there is illustrated a rapid transit system 10 according to the invention. In general terms, this transit system comprises a vast network of main guide lines and interconnecting feeder lines with a multiplicity of boarding stations conveniently spaced. A typical portion of the system is shown where a main line or feeder line 12 includes a main guide line 14 having a number of loading-unloading stations 16 spaced therealong and decelerating side guide lines 18 leading from the main line to each station and then back with an acceleration guide line 18' to the main line. Each side line 18 and 18' merges with the main line 14 at junctions 20 and 22 which are hereinafter referred to as station or siding entrance and exit junctions, respectively. Located at the entrance junction 20 are switches 24 which are referred to as station or siding entrance switches.

In addition to the guide line means 12, the present rapid transit system 10 includes a number of cars 28 which are movable along the guide line means 12, and driving means 30 for propelling the cars independently along the guide line. Cooperatively associated with the cars 28 and the guide line switches 24 are presettable automatic car routing means 32. As will be explained presently, these car routing means are uniquely constructed and arranged in such a way that they may be preset to effect automatic travel of any car 28 from any one of the stations 16 to any one of the remaining stations along the route of the main line 14 or to stations along interconnecting lines. In the ensuing description, when discussing the automatic travel of a car from one station to another, the station from which the car leaves will be referred to as the station of departure and the station to which the car travels will be referred to as the station of destination.

It will be recalled that the present rapid transit system may be designed to transport either cargo or passengers. The particular transit system illustrated is a passenger conveyance which is designed to transport passengers along selected inter-city and/or intra-city routes. In this case, the loading-unloading stations 16 are passenger stations at which passengers may embark on or disembark from the cars 28 The automatic car routing means 32 of the transit system includes a station selector 34 at each station 16 which is adapted to be operated by a passenger boarding the car and a station switch operator 35 on each car. In the course of this operation, the passenger presets into the station selector the station of destination to which he wishes to travel. The car is then driven from the respective station of departure, along the corresponding accelerating line 18', onto the main line 14, and then along the main guide line toward the selected station of destination. As the car approaches the junction 20 of the main line 14 with the siding 18 leading to the selected station of destination, the station entrance switch 24 at the junction is automatically operated to direct or divert the approaching car from the main line onto the siding, with no decrease in speed until it clears the main track. Frictional braking means (not shown) are provided which are applied automatically as the car approaches a station so as to bring the vehicle to a smooth and gradual stop at the station. The passenger then disembarks from the car 28, leaving the latter at the station for use by another passenger who wishes to travel from the station to another station.

Referring now in greater detail to the embodiment of the invention which has been selected for illustration in the drawings, the guide line means 12 are elevated and supported on upright posts 44. The lines 14 and 18 which make up the guide line means 12 are essentially identical, differing only in their longitudinal configuration. Accordingly, it is unecessary to describe each guide line separately. Suffice it to say that each line comprises a series of main supporting beams in the form of an inverted channel 46. This channel extends between and is rigidly attached to cantilevered arms 48 at the upper ends of the beam supporting posts 44. Bolted or otherwise rigidly secured to the sides of the channel 46, at uniform intervals therealong, are supporting rollers 56 or slides 54. It is envisioned that the rollers 56 will be employed at low speeds (such as incurred upon a siding or feeder line) with slides 54 being employed (instead of rollers 56) at high speeds (such as incurred upon main guide line 14).

The several cars 28 are essentially identical. Accordingly, a description of one will suffice for all. Each car has a cargo carrier 58 which, in this instance, is a streamlined passenger compartment having seats 60 for one or two passengers. The passenger compartment is equipped with exit doors 62 through which passengers may enter and leave the compartment.

Mounted on top of the car 28 is an articulated tow bar 64 which rides on the track rollers 56 or slides 54. It will be observed that the tow bar is positioned between the upper and lower rollers 56 and is vertically supported by the rollers. Lateral bearing rollers for the tow bar may be provided along curves, to resist lateral wind loads on the car, or as otherwise required. Tow bar 64 is composed of a number of separate sections 66 disposed end to end and pivotally joined by hinge connections 68. Hinge connections 68 have normally generally vertical pivot axes and permit the tow bar to articulate in such a way as to traverse horizontally curved portions of the guide lines 12. In order to permit the tow bar to traverse vertically curved portions of the guide lines, that is, curved portions of the support beams joining sections of different slope, the tow bar sections 66 are made laterally flexible.

The compartment 58 of each car 28 is firmly attached to its tow bar 64 by short beam 72 secured to the roof of the compartment. The car is mounted on one of the tow bar sections 66 adjacent the trailing end of the bar. In this case, it is mounted on the second to the last section, so that the tow bar projects some distance forwardly of the car.

The illustrated car driving means 30 comprises a number of powered driving wheels 74. Each wheel is driven by a motor 76. The drive wheels 74 are arranged in pair disposed within the gap 19 between adjacent sections of the main line 14. The two drive wheels of each wheel pair are aligned laterally of the track means and disposed for peripheral driving engagement with opposite sides of the tow bar 64. The extended length of tow bar 64 easily traverses the gaps 19. The spacing between adjacent drive wheel pairs is normally less than the length of the tow bar. They may have greater spacing on the level or down-hill portions of the main track or closer spacing for more power on up-hill portions of the track if the driving motors all have the same power output. It is envisioned that in actual practice a spacing of 40 feet between drive wheel pairs would be adequate, with a slightly greater length of tow bar being employed.

It is now evident that a car 28 is to be propelled along the guide line 12 by energizing the drive wheel motors 76. The motors 76 are to remain in an unenergized state until a tow bar approaches. The approaching tow bar activates a switch which in turn starts the motors 76. The energization is accomplished enough in advance in time for the pair of motors to "build up" to full speed prior to contact by the tow bar. These motors may be controlled to regulate the speed of the car along the guide line. Also, the speed at which the drive wheels 74 are driven by their motors 76 will vary along the accelerating line 18' to cause the car to accelerate. The two drive wheels of each wheel pair will always rotate at the same speed. The speed is established in the design of the system and cannot be controlled by the passenger.

Preferably, the drive wheels 74 are frictional driving rollers which establish simple frictional driving contact with the sides of the tow bar 64. It is desired to mount each motor 76 to an arm 49. Each arm 49 is connected through a hinge connection 77 to a rod 79 which is rigidly attached to attaching plate 51. Each of the attaching plates 51 are secured to a segment of the main line 14. The motors 76 are mounted above (in respect to the ground) the tow bar 64. The hinge connections 77 are each located adjacent the end of the motors 76 which is furthermost from the drive wheels 74. This causes the motors 76 to normally rest by gravity in such a manner so that the drive wheels are frictionally held against the tow bar 64.

The several station switches 24 are identical so that a description of one will suffice for all. Each switch includes a switch plate 78 which is slidably mounted on the underside of the guide channel beam 46 for endwise movement laterally of the beam. Depending from the underside of the plate are a pair of rigid arms 80 reinforced by gussets 82. These arms mount horizontal and vertical tow bar engaging rollers 84, 86. The horizontal switch rollers 84 are aligned with the other track rollers 56 to support the car tow bars 64 in the vertical direction. The vertical tow bar rollers 84 are disposed to engage opposite sides of and exert lateral switching loads on the tow bars. The tapering of the forward end of the tow bar facilitates the movement of the tow bar to the side guide line 18 upon contacting a roller 84. Each switch is urged to its normal position by a spring 88 and to its second position by a solenoid 89.

In the normal position of each station entrance switch 24, the latter permits a car to travel straight through the corresponding station entrance junction 20. In the other position the switch diverts the car onto the siding 18 leading from the switch junction. As will appear presently, the track switch 24 is energized in the same manner by the automatic closing of an electrical switch by the approaching car. Energizing the switch solenoid 89 pulls the slide 78 to the second switch position. When the electric current is turned off, switch spring 88 returns the slide to its normal position. The car automatically turns off the energy as it leaves the switch so the switch will return to its normal position.

The station exit junction 22 does not have any moving parts as does the entrance junction switch 24. The exit junction 22 merely includes guide means to maintain the movement of the tow bars along the main line 14 and also guide means to effect entry of a tow bar from the side guide line 18' upon the main guide line 14.

Turning now to FIG. 17, it will be observed that associated with each station entrance switch 24 are a pair of relays 92, 94. Relay 92 has a coil 96 with terminals 96a, 96b. Terminal 96a is a hot terminal energized directly from an electrical power supply. Terminal 96b is a ground terminal situated along the main line 14 some distance ahead of the switch and provides a car approach detector to be energized or grounded by the station switch operator 35 on an approaching car 28, as explained presently. Relay 92 has a holding coil 98, one end of which connects to the relay terminal 96a through a set of normally open relay holding contacts 100. The other end of the holding coil 98 connects to one terminal of the station switch solenoid 89. Relay 94 has a set of normally closed contacts 102 which connect the other terminal of the switch solenoid to a grounded relay terminal 94a. Accordingly, simultaneous closure of the relay contacts 100, 102 energizes the track switch solenoid. Relay 94 has a coil 104 with terminals 104a, 104b. Terminal 104a is a hot terminal energized directly from an electrical power supply. Terminal 104b is a ground terminal situated along the side guide line 18 some distance following the station switch 24 and provides a car exit detector to be energized or grounded by contact with the tow bar of a car entering the siding.

From this description, it will be understood that each station entrance switch 24 remains in its normal position, wherein the switch opens to the main line 14, until the switch approach detector 96b is grounded by the station switch operator 35 of an approaching car 28, as explained below. When this occurs, the relay coil 96 energizes to close the relay holding contacts 100. This, in turn, locks the relay in its energized state and energizes the station switch solenoid 89 to shift the station switch 24 to its station position. The approaching car is thus diverted to the passenger station 16. As the car enters the side guide line its tow bar engages and grounds the switch exit detector 104b. This opens the relay contacts 102 to break the holding circuit for relay 92 and deenergize the station switch solenoid 89. The station switch 24 thus returns to normal position.

Means has to be employed to prevent a following car from coming into contact with the next succeeding car.

To prevent such a possibility of collision, the motors 30 are electrically interconnected in a particular manner as represented by FIG. 19 of the drawings. The motors A through G are electrically connected to the main power line 300. The switch 24 is located between the main power line 300 and each of the motors 30. Prior to the tow bar of the car coming into contact with one of the motor assemblies 30, the switch 24 for that particular motor assembly is activated supplying power to the motor assembly and permitting it to build up to speed prior to coming into contact with the tow bar.

It is also to be noted that motor assembly G is electrically connected through a low voltage transformer 302 to a relay 304. Relay 304 is associated with motor assembly D and is adapted, upon being actuated, to effect movement of switch 306. Upon switch 306 being moved by the relay 304, a resistor 308 is placed within the electrical circuit for motor D, which results in a greater load being applied within that circuit causing the motors within the motor assembly D to substantially decrease in rotational velocity. If motor G is operating at full speed, then automatically motor assembly D includes the increased load. Motor assembly D is the third motor assembly in the aft direction with respect to the direction of travel from the motor assembly G. In other words, if a following car and tow bar is moving up on the next succeeding car, the following car will be caused to move at a slower speed by motor assembly D. This arrangement is to be for each of the motor assemblies so that, upon a particular motor assembly being operated, the third motor assembly in the aft direction, if it is operated, is operated at a slower speed. Such an arrangement will absolutely prevent the possibility of a rear end collision by one car respective to another.

There is also the possibility that upon a car leaving the side guide line 18', such can strike either a passenger car (or its connected tow bar) which is moving along the main line 14. To preclude any chance of such an accident occuring, a relay assembly 310 is to be secured to the motors H through M which are located upon the side guide line 18'. Referring particularly to FIG. 1, if a tow bar of a car which is moving along the main line 14 has effected actuation of either motor assembly A, B or C, the motor assemblies K through M are located in an inactive position. This is accomplished by locating a relay 310 to shunt lines 312, 314, and 316. Shunt line 312 is connected to motor assembly C with the shunt line 314 being connected to motor assembly B with shunt line 316 being connected to motor assembly A. If either of motor assemblies, A, B or C are active, energy is being transmitted to relay 310 which results in movement of switch 318 to the open position. With switch 318 in the open position, interchange from the main power line 300 is not capable of being transmitted to the side power line 320. The energy from the side power line 320 is to be used to effect operation of the side line motors K through M. The final result of this aforementioned system is that if a car has effected actuation of motors A, B and/or C, the side line motors K through M are inactive and would prevent movement of a car from the side line to the main line which might come into contact with the car moving along the main line 14. When the relay 310 becomes inactive, the spring loaded switch 318 will return to a closed position and allow energy from the main line 14 to reach the waiting car on the side line 18'. The location of these shunts 312, 314 and 316 will be determined by the design speed of the system for both the normal speed for the reduced speeds of the system.

It will be recalled that the present transit system is equipped with automatic car routing means 32 including a station selector 34 at each passenger station 16 and a station switch operator 35 on each car 28. A passenger boarding a car at any passenger station may preset into the corresponding station selector any desired station of destination along the transit route. The station entrance switch 24 leading to that station will be automatically positioned as the car later approaches the switch on the main track 14, so as to direct the car to the selected station.

Various station switch operating means may be employed for this purpose. In the particular inventive embodiment selected for illustration, the switch operating means includes the switch operator 35 on each car 28. This switch operator has a belt 112, the ends of which are wound about and secured to a pair of reels 114 and 116. Reels 114, 116 are rotatably mounted in spaced parallel relation on a housing 118. For convenience in the ensuing description, reel 114 is referred to as a take-up reel and reel 116 as a supply reel. Attached to the take-up reel 114 is a spring 120. This spring tends to rotate the reel in a direction to wind the belt 112 on the reel. A light frictional drag is imposed on the supply reel 116, as by a friction brake 122, to maintain the belt taut. Keyed to one end of the supply reel 116 is a toothed sprocket wheel 124. As will be explained presently, this sprocket wheel is adapted for engagement by presettable station selector pawls 126 located at each passenger station 16. These pawls are operatively connected to the corresponding station selector 34 in such a way that the pawls are preset by each passenger when he operates the station selector upon boarding the car 28 at the respective station. The pawls are thus preset in accordance with the passenger's desired station of destination. As the car 28 containing the passenger departs from the station, the pawls 126 engage the sprocket wheel 124 of the station switch operator 35 on the car to rotate the sprocket wheel in a direction to wind from the take-up reel 114 under the supply reel 116 a length of the switch operator belt 116 related to the number of stations from the station of departure to the selected station of destination. This movement of the belt from the take-up reel to the supply reel occurs against the action of and winds up the take-up reel spring 120.

Operatively connected to the take-up reel 114 is an escapement mechanism 128. This escapement mechanism normally prevents rotation of the reel 114 by the spring 120 in a direction to wind the belt 112 back on the reel. To this end, the escapement mechanism 128 has an escapement wheel 130 attached to one end of the take-up reel 114 by means of a one-way clutch mechanism 132. This one-way clutch mechanism may comprise a simple ratcheting mechanism. This mechanism permits the reel 114 to rotate relative to the escapement wheel 130 only in the direction in which the reel turns to unwind the belt 112 from the reel to the supply reel 116. Also included in the escapement mechanism 128 is an escapement lever 134. This lever is pivoted between its ends on the switch operator housing 118. As will appear presently, the end 134a of the escapement lever remote from the escapement wheel 130 functions as a cam follower and, for this reason, will be hereinafter referred to as a cam follower.

As just noted, the station switch operator 35 on each passenger car 28 and the station selector pawls 126 at each passenger station 16 are arranged in such a way that the pawls engage and rotate the switch operator sprocket wheel 124 as the car departs the station. To this end, the switch operator 35 on each car is mounted on top of the car tow bar 64. The station selector pawls 126 at each passenger station 16 are mounted on the corresponding side line 18' close to the start of departure. The pawls 126 are arranged in a row along the path of movement followed by the switch operator sprocket wheel 124 on each car 28 as the latter moves along the side guide line. All of the pawls in the row, except perhaps the first pawl, comprise the plungers of solenoids 136. These plunger pawls are movable vertically in their respective solenoids between lower extended positions, wherein the pawls are disposed to engage the switch operator sprocket wheels 124 on the cars 28, and upper retracted positions, wherein the pawls are disposed to clear the sprocket wheels. These pawls are normally spring retracted and are extended by energizing of the solenoids. For reasons to be explained presently, the first station selector pawl in the row may be fixed in its extended position.

It will now be understood that the station selector pawls 126 at each passenger station 16, when extended, are disposed to rotate the sprocket wheel 124 of the station entrance switch operator 35 on each car 28, as the car departs the station, in a direction to wind from the switch operator take-up reel 114 to its supply reel 116 a length of the switch operator belt 112 related to the number of pawls which are extended. Thus, if we let $l$ represent the length of the belt which is fed from the take-up reel to the supply reel in response to rotation of the switch operator sprocket wheel 124 by a single pawl 126, the total length of the belt which is wound on the supply reel is $l \times n$, where $n$ is the number of pawls extended.

According to the present invention, each passenger station 16 along the transit route will contain a number of the station selector pawls 126 equal to the number of stations along the route following the respective station. Assume, for example, a transit route with a total of twenty passenger stations 16. In this case, the fourth station along the route (station No. 4) will have sixteen station selector pawls corresponding to the sixteen stations following station No. 4. The seventeenth station along the route (station No. 17) will have three station selector pawls corresponding to the sixteen stations following station No. 4. The seventeenth station along the route (station No. 17) will have three station selector pawls corresponding to the three stations following station No. 17, and so on. As each passenger boards a car 28 at any given station of departure, bound for a selected station of destination, he will actuate the station selector 34 at the departure station in such a way as to preset in their extended positions a number of the station selector pawls 126 at the departure station equal to the number of stations from the departure station to the selected station of destination. Thus, if a passenger boards a car at station No. 7, bound for a station No. 16 along a transit route having a total of twenty stations, the passenger will operate the station selector 34 at station No. 7 in such a way as to effect extension of the first nine of the total thirteen station selector pawls 126 at station No. 7, It will be recalled, of course, that the first pawl at each station may be fixed in its extended position. The main line is a large loop so it is possible for the passenger to come back to his starting point. If there were 20 stations on th line, the 20th pawl would bring the passenger back to his starting point in a single non-stop ride. In the total system there are many feeder lines and many main lines. This description covers only one line. The belt on this mechanism need be no more than ½ inch wide so there is room for several similar mechanisms. Then the passenger choosing a station that required entering a feeder line to a main line to another feeder line and then to his destination would simply look up the list of stations at the station he was departing from and press the button designating the station he wished to reach. This will actuate the correct number of pawls to pass the stations on the first feeder line and the required number on the final feeder line to his destination. It would also actuate a second set of pawls to operate on a second counter for causing the car to turn onto the main line and pass the required number of stations on the main line. This principle can be applied to two or more counter systems. In the above case it would require three. The first one would account for the number of bypassed stations on the first and second feeder lines with the correct turn off at the required destination. The second counter would actuate the turn onto the main line. The third counter would bypass the intervening main line stations to turn onto the final feeder line.

The above described selective extension of the station selector pawls 126 at each passenger station 16 by operation of the corresponding station selector 34 may be accomplished in various ways. In the drawings, each station selector 34 comprises buttons 138 which are numbered to correspond to the following passenger stations 16 along the transit route. These buttons operate switches which are wired to the solenoids 136 of the station selector pawls 126 at station No. 7 in such a way that depression of the button corresponding to any station will energize the solenoids for the station selector pawls corresponding to that station. For instance, in the cited example, depression of the button for station No. 13 will energize the solenoids for the first eight movable station selector pawls 126 (the first pawl being permanently extended). Obviously, this wiring can be accomplished in various ways. It may be possible that so many people desire to disembark at a given station that the traffic will back up to the entrance 20. The present transit system can be designed so that if this occurs, the switch 24 will not operate and the following cars will be automatically routed to the next station.

From the foregoing description, it is evident that the switch operator 35 in each passenger car 28 constitutes, in effect, a station counter which registers a station count each time the car passes a station 16 and accumulates a count representing the number of stations passed by the car. The switch operator or counter 35 is effectively preset, by a passenger entering the car at a station of departure, with an accumulated station count representing a selected station of destination. Upon arrival of the car at the at the guide line exit switch 24 leading to the selected station of destination, the accumulated station count and preset station count in the counter are equal. When this occurs, the counter actuates the guide line switch to divert the car to the selected station.

It is now evident that as a passenger car 28 departs any given passenger station 16 along the transit route, bound for a selected station of destination, the station switch operator 35 on that car will be actuated by the extended station selector pawls 126 to feed the switch operator belt 112 from its take-up reel 14 to its supply reel 16. The length of the belt which is thus fed from the take-up reel to the supply reel is equal to the belt advance $l$ produced by one selector pawl 126 times the number of stations the car passes through from the station of departure to the selected station of destination. As the car proceeds along the main track 114 toward the selected station of destination, the cam follower portion 134a on the escapement lever 134 of the station switch operator 35 on the car is periodically tripped or depressed by cams 140 on the main track, just ahead of each station entrance switch 24. This periodic tripping action of the escapement lever permits intermittent rewinding of the belt 112 of the station switch operator 35 on the car onto its take-up reel 114, under the action of the reel spring 120. Each intermittent feeding action of the belt from the supply reel to the take-up reel, in response to a single depression of the escapement lever 134, feeds onto the take-up reel a length of the belt equal to the belt advance $l$.

It will now be understood that when a passenger car 28 of the present rapid transit system departs any passenger station 16, bound for any selected station of destination, the belt 112 of the station switch operator 35 on that car is initially wound, in a single winding action, from its take-up reel 114 to its supply reel 116, by the station switch selector pawls 126 at the station of departure. Thereafter, as the car proceeds along the main line 14 toward the selected station of destination, the belt is intermittently rewound on the take-up reel in stepwise fashion as the car approaches each of the station entrance switches 24. As the car approaches the entrance switch 24 leading to the selected station of destination, the guide line cam 140 immediately preceding the switch will effect final rewinding of the last increment of the switch operator belt 112 on its take-up reel 114. Mounted on this last increment of the belt are means 142 for effecting operation of the entrance switch 24 leading to the selected station of destination to its siding or station position.

Various switch operating means may be provided on the belt for this purpose. In this case, the switch operating means 142 comprise a grounded electrically conductive segment on the belt which is exposed when the belt is fully rewound on its take-up reel 114 and which is disposed to engage the station switch approach detectors 96b to operate the station entrance switches 24 in the manner explained earlier.

Referring particularly to FIG. 18 of the drawings, there is shown an override switch assembly 200 which is to be employed within the system of this invention. Let it be assumed that the operator within the passenger car has set the preselector switch in the manner as previously described. Further, let it be assumed that the operator has changed his mind in route and desires to disembark from the system at a station prior to his preselected station. For this purpose, the override switch 200 is to be employed.

The override switch 200 includes the use of an actuator 202 which is pivotally secured through a fulcrum 201 which is located within the tow bar 64 located above the passenger car. Actuator 202 is biased by means of a spring 204 toward a position so that plate 206 is not in contact with electrodes 208 and 210. The actuator 202 is to be moved manually by the operator by means of an actuating knob 212. An electrical conductor 214 is connected between electrode 208 and solenoid 89. An electrical conductor 216 is connected between electrode 210 and the other side of the solenoid 89.

Upon actuation of actuator 202 through a knob 212 so that the plate 206 comes into electrical contact with the electrodes 208 and 210, activation of solenoid 89 is effected. It is to be understood that this is to be accomplished just prior to reaching the particular selected station in which the party desires to disembark. The electrodes 208 and 210 are the same electrodes which are to be contacted by the switch operating means 142. The operator, upon accomplishing the movement of the override switch 200, must hold switch 200 in this position until plate 206 comes into contact with the electrodes 208 and 210. As a result, switch 24 is activated in the manner as previously explained, resulting in the passenger car being conducted along the side line 18 of the station.

Upon activation of the override switch and movement of the passenger car into a station other than what was preselected, the station selector 34 must be preset at zero. This is accomplished by having the escapement mechanism 128, actually escapement lever 134, be contacted by a cam means upon the side guide line to which the passenger car has now been routed. As a result, as previously described, the station selector 34 is reset at zero. Such presetting to zero is desirable so as to not alter the selection of the subsequent operator of the passenger car. This resetting group of cams are provided on all sidings. If the passenger does not know the station of destination until he sees it he selects an extreme station far down the line and uses the override switch when he sees that he is approaching the station he desires.

The operation of a present rapid transit system is now obvious. Thus, a passenger may board a passenger car 28 at any one of the passenger stations 16. Just prior to boarding a car, the passenger operates the station selector 34 at his particular station of destination by pushing the selector button corresponding to his desired station of destination. He then boards the lead passenger car 28 in the unpowered guide line section S at the station. The passenger will turn a switch to start the car when he is seated. The car is then propelled and accelerated along the side guide line to the main line 14 leading to the selected station of destination, and finally along the corresponding side guide line to this station. In the event that any car 28 departs any of the stations 16 in an empty condition, owing to ejection of the car from the corresponding unpowered track section S, the permanently extended station selector pawl 126 at the station will preset the station switch operator 35 on the empty car for exiting at the next station. As a consequence, the empty car will proceed from its station of departure to the main track and along the track, where the car will be diverted to the following station.

Each station has provision for a full complement of cars. When a car enters the station it stops at the first boarding spot. It will remain there until a passenger actuates the starting switch or until another car enters. When a second car enters it energizes a set of motors to move the first car one step further along. If the station complement is full the lead car will go on empty to the next station. The lead car cannot start if the passenger has the door open.

Foremost among the unique and highly beneficial features and advantages of the present high speed transit system are the following:

1. A light-weight car and tow bar that minimizes the movable load.
2. A relatively inexpensive track system because of the light cars and limited loads.
3. A track system that can be installed and operate along any street without disrupting the existing foot or vehicle traffic.
4. A system that projects the cars over the street and above all vehicular traffic.
5. A system that uses electricity for power so it produces no air pollution.
6. A system that accelerates the car and passenger only once to reach cruising speed, maintains that cruising speed to the final destination, and decelerates only once to come to rest.
7. A system that can move people very fast because each one is whisked from his starting point to his destination without slowing or stopping between points and because the cars can travel without restriction while touching one another.
8. A system that is economical to operate because the power and drivers are external and not carried as dead weight.
9. A system that is economical to operate because most maintenance chores can be performed without stopping traffic because workmen can work from above and even remove and replace a set of drivers.
10. A system that is relatively free of stoppage from labor disputes because it is fully automatic and except for normal maintenance requires no human control.
11. A system that is not affected by adverse weather.
12. A system that is very save because cars cannot collide with one another or with other objects.
13. A system that allows for a narrow elongated boarding station that can be built above any sidewalk.

What is claimed as new in support of Letters Patent is:

1. A rapid transit system comprising:
   guide line network;
   a car movable throughout said network, said car being fixedly connected to a tow bar, said tow bar being movably supported on said guide line network, said tow bar being of a car length substantially greater than the length of said car;
   drive means connected to said guide line network for moving said car along said guide line network, said drive means including uniformly spaced drive motor units, the length of said tow bar to be sufficient to extend between any adjacent sets of said drive motor units, each of said drive motor units being activated upon the approach of said tow bar, said drive motor units do not move with said car but include a plurality of separate drive motors; and
   said drive motors being two in number within a single drive motor unit, each of said drive motors being spaced above said guide line network, said motors of a single unit being hinged together on a common axis whereby said motors are continuously biased by gravity toward engagement with said tow bar.

2. The system of claim 1 wherein:
   said guide line network having a gap between support beams, said tow bar being able to traverse said gap, said drive motors of a single motor unit being located within said gap.

3. A rapid transit system comprising:
   a guide line network;
   a car movable throughout said network, said car being fixedly connected to a tow bar, said tow bar being movably supported on said guide line network, said tow bar being of a length substantially greater than the length of said car;
   drive means connected to said guide line network for moving said car along said guide line network, said drive means including uniformly spaced drive motor units, each said motor unit having a drive wheel, each said drive wheel being in alignment with said tow bar and is adapted to contact said tow bar, the length of said tow bar to be sufficient to extend between any adjacent sets of said drive motor units; and
   said guide line network having a gap between support beams, said tow bar being able to traverse said gap, said drive motors of a single motor unit being located within said gap.

4. A rapid transit system comprising:
   guide line network;
   a car movable throughout said network, said car being fixedly connected to a tow bar, said tow bar being movably supported on said guide line network, said tow bar being of a length substantially greater than the length of said car;
   drive means connected to said guide line network for moving said car along said guide line network, said drive means including uniformly spaced drive motor units, each said motor unit having a drive wheel, each said drive wheel being in alignment with said tow bar and is adapted to contact said tow bar, the length of said tow bar to be sufficient to extend between any adjacent sets of said drive motor units;
   said guide line network includes a main line and a plurality of feeder lines having a number of stations spaced therealong and a plurality of side guide lines leading from said main line to said stations, a switch at each of the inlet junctions of said main line and said side guide line;
   presetable automatic car routing means for operating each of said switches to direct said car from any station of departure to any selected station of destination; and
   an override switch being connected to said car, upon actuation of said override switch said car is to be directed into the immediately next succeeding station regardless of the station setting established by said presetable automatic car routing means.

5. A rapid transit system comprising:
   guide line network;
   a car movable throughout said network, said car being fixedly connected to a tow bar, said tow bar being movably supported on said guide line network, said tow bar being of a car length substantially greater than the length of said car;

drive means connected to said guide line network for moving said car along said guide line network, said drive means including uniformly spaced drive motor units, the length of said tow bar to be sufficient to extend between any adjacent sets of said drive motor units;

said tow bar is articulated and comprises a number of pivotally joined sections, said car being mounted upon an intermediate section of said tow bar; and said guide line network includes low frictional rollers and slides, said tow bar to operate upon said rollers with said car moving at slow speed, said tow bar to operate upon said slides with said car moving at high speed.

6. A rapid transit system comprising:

guide line network;

a car movable throughout said network, said car being fixedly connected to a tow bar, said tow bar being movably supported on said guide line network, said tow bar being of a car length substantially greater than the length of said car;

drive means connected to said guide line network for moving said car along said guide line network, said drive means including uniformly spaced drive motor units, the length of said tow bar to be sufficient to extend between any adjacent sets of said drive motor units;

slowing means connected to said drive means to prevent a following car from coming into contact with the next succeeding car, each of said drive motor units being capable of operating at full speed or a reduced speed, upon actuation of a first drive motor unit at full speed a second drive motor unit located aft of first drive motor unit is to be driven at said reduced speed.

7. The system as defined within claim 6 wherein:

a third and fourth drive motor unit being located between said first and second drive motor units.

8. A rapid transit system comprising:

guide line network;

a car movable throughout said network, said car being fixedly connected to a tow bar, said tow bar being movably supported on said guide line network, said tow bar being of a length substantially greater than the length of said car;

drive means connected to said guide line network for moving said car along said guide line network, said drive means including uniformly spaced drive motor units, each said motor unit having a drive wheel, each said drive wheel being in alignment with said tow bar and is adapted to contact said tow bar, the length of said tow bar to be sufficient to extend between any adjacent sets of said drive motor units;

said guide line network includes a main line and at least one side line;

said car being capable of being selectedly conducted from said main line upon said side line and from said side line back upon said main line;

anti-collision means connected to both said main line and said side line to prevent said car on said side line from leaving said side line and coming into contact with a car upon said main line, upon a said car upon said main line activating certain selected motor units upon said main line adjacent said side line the motor units upon said side line being caused to be incapable of activation.

* * * * *